April 17, 1962     L. A. McINTOSH     3,030,101
SPRING SHACKLE
Filed Feb. 12, 1959     4 Sheets-Sheet 1
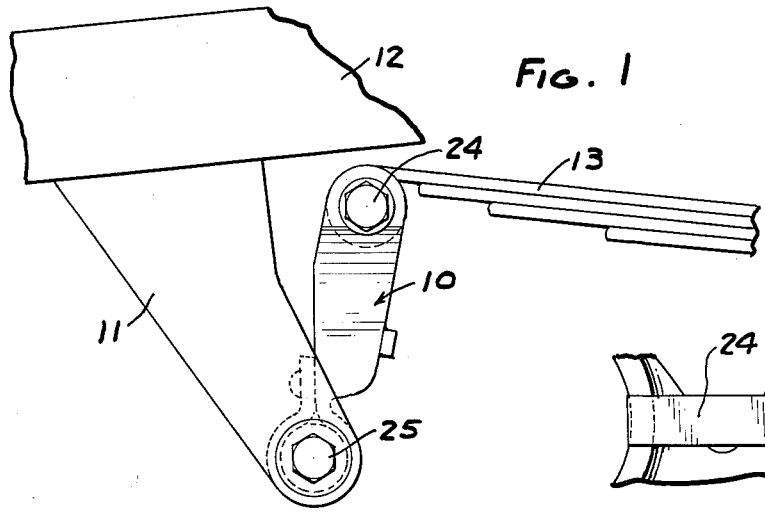
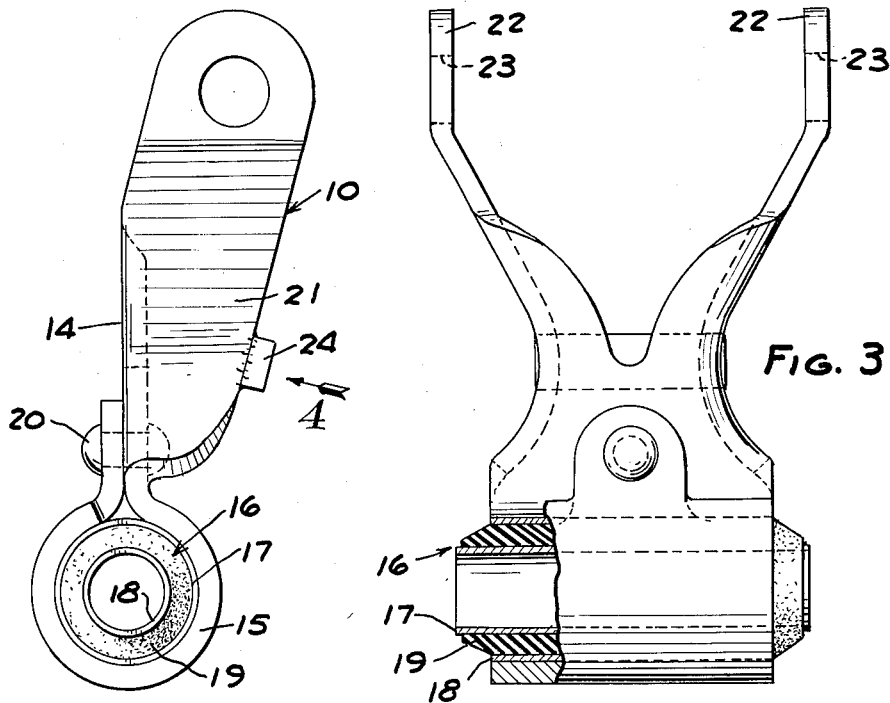
INVENTOR.
LESTER A. McINTOSH
BY
Barnes, Kisselle, Raisch & Choate
ATTORNEYS

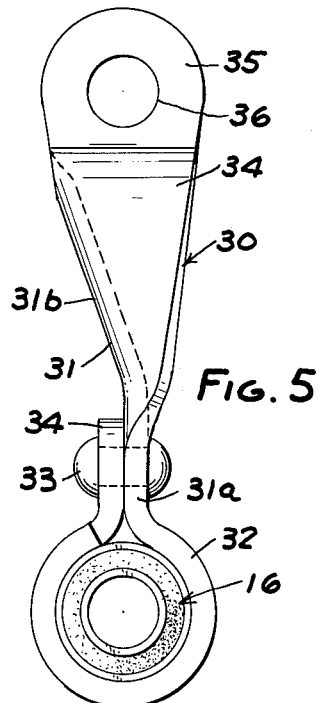
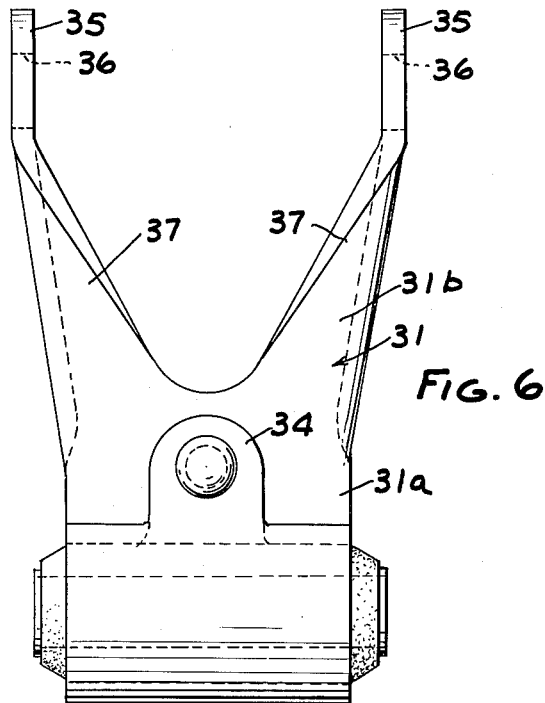
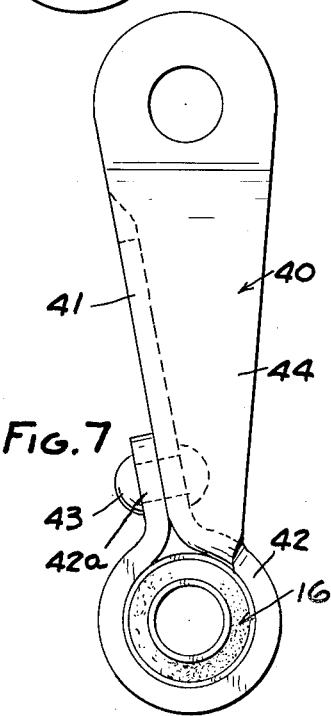
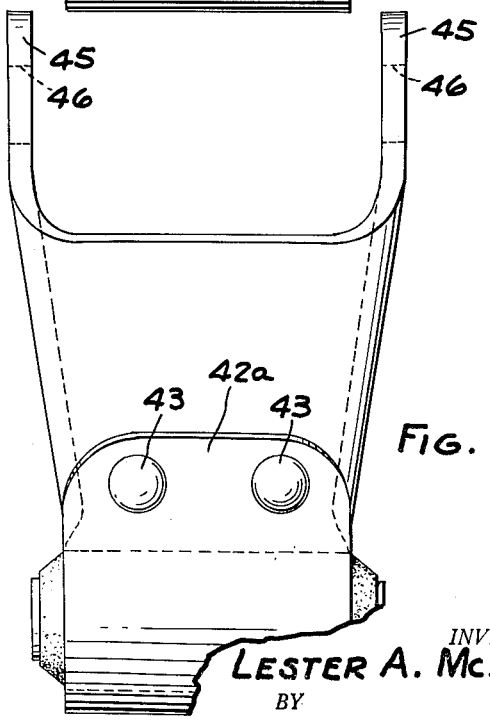

April 17, 1962   L. A. McINTOSH   3,030,101
SPRING SHACKLE
Filed Feb. 12, 1959   4 Sheets-Sheet 3
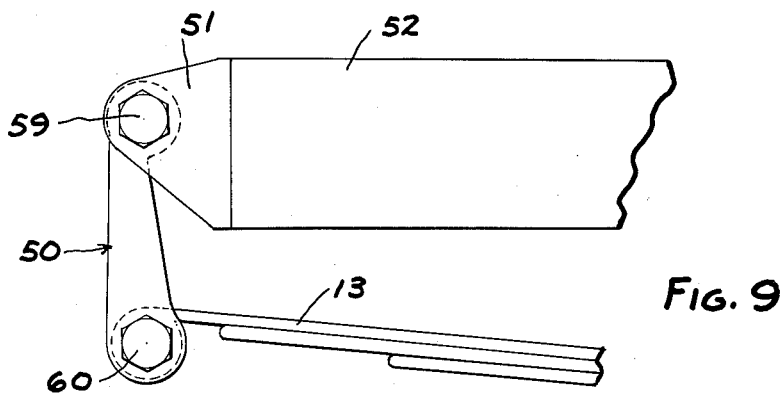
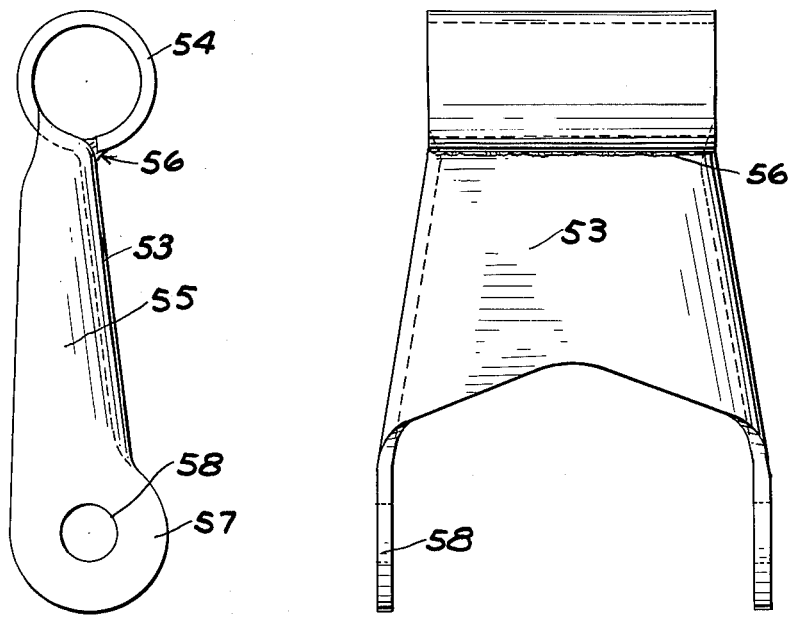
INVENTOR.
LESTER A. McINTOSH
BY
Barnes, Kisselle, Raisch & Choate
ATTORNEYS April 17, 1962   L. A. McINTOSH   3,030,101
SPRING SHACKLE
Filed Feb. 12, 1959   4 Sheets-Sheet 4
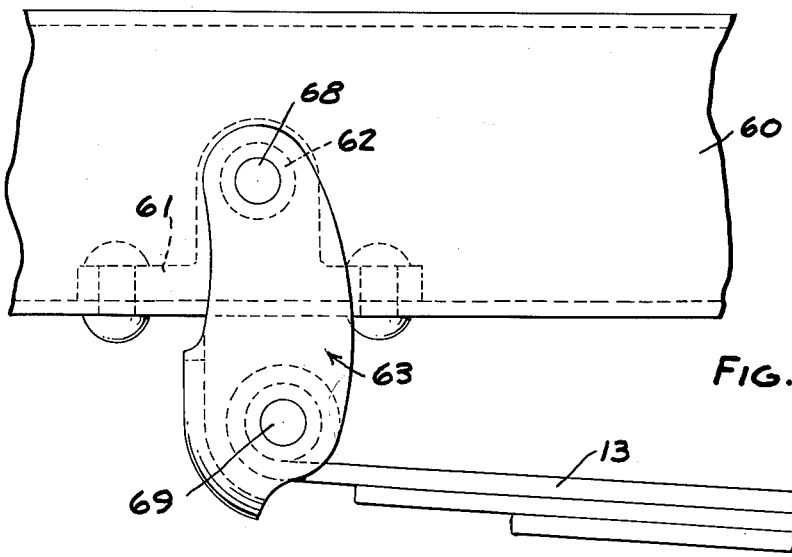
FIG. 12
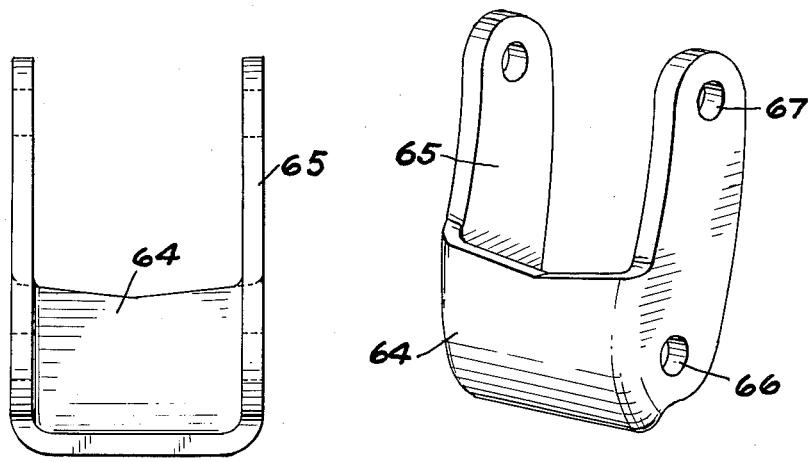
FIG. 13
FIG. 14
INVENTOR.
LESTER A. McINTOSH
BY
Barnes, Kisselle, Raisch & Choate
ATTORNEYS United States Patent Office 3,030,101
Patented Apr. 17, 1962

3,030,101
SPRING SHACKLE
Lester A. McIntosh, % McIntosh Stamping Corp.,
13881 Elmira Ave., Detroit, Mich.
Filed Feb. 12, 1959, Ser. No. 792,814
8 Claims. (Cl. 267—54)

This invention relates to vehicle springs and particularly to a spring shackle for pivotally supporting one end of a spring on a vehicle frame.

Shackles are customarily used to pivotally connect one end of a spring on a vehicle frame. Such shackles must be of sufficient strength to withstand the loads incident to movement of the vehicle on the ground. Specifically, such shackles are subjected to excessive side loads. In order to provide shackles of adequate strength, it has been customary to make them from forgings or malleable castings. In addition, shackles have been made by assembling stampings. Each of these types of shackles are expensive to manufacture and have resulted in increased costs to the vehicle manufacturer.

It is an object of this invention to provide a shackle made from a single sheet metal stamping which is of adequate strength to support the spring on the vehicle frame and particularly to withstand the large side load incident to movement of the vehicle along the ground.

In the drawings,

FIG. 1 is a fragmentary side elevational view of a spring shackle embodying the invention in spring supporting position.

FIG. 2 is a side elevation of the spring shackle shown in FIG. 1 on an enlarged scale.

FIG. 3 is a front elevation of a spring shackle shown in FIG. 2, parts being broken away.

FIG. 4 is a fragmentary side view substantially along the line of the arrow 4 in FIG. 2.

FIG. 5 is an end elevation of a modified form of spring shackle.

FIG. 6 is a side elevation of the shackle shown in FIG. 5.

FIG. 7 is an end elevation of another modified form of spring shackle.

FIG. 8 is a fragmentary front elevation of the spring shackle shown in FIG. 7.

FIG. 9 is a side elevation of another modified form of spring shackle showing the shackle in position for supporting the end of a spring.

FIG. 10 is a side elevation on an enlarged scale of the spring shackle shown in FIG. 9.

FIG. 11 is a front elevation of the spring shackle shown in FIG. 10.

FIG. 12 is a side elevation of another modified form of the spring shackle showing the shackle in position for supporting the end of a spring.

FIG. 13 is a rear elevation of the spring shackle shown in FIG. 12.

FIG. 14 is a perspective view of the spring shackle shown in FIGS. 12 and 13.

Referring to FIG. 1, shackle 10 embodying the invention is pivotally mounted at its lower end to the spaced leg portions of a shackle bracket 11 projecting downwardly from frame 12 of the vehicle. The end of a spring 13 which supports the axle of the vehicle is pivoted to the upper end of shackle 10.

As shown in FIG. 2, shackle 10 is made from a single stamping of sheet metal and comprises a central flat body portion 14 and a lower end portion 15 curved in the form of a cylinder to support a shackle bearing 16 comprising spaced metal sleeves 17, 18 bonded to a cylinder of rubber 19. The free end of cylindrical portion 15 is fastened to the central body portion 14 by rivet 20.

Shackle 10 also includes spaced laterally extending flanges 21 extending outwardly from the central body portion 14 and upwardly to form spaced parallel arms 22 having aligned openings 23 therein. Flanges 21 are at generally right angles to the plane of central body portion 14. The upper ends of arms 22 in which the openings 23 are positioned are in parallel relationship to one another. A cross bar 24 is welded to and extends between the lower ends of flanges 21 to provide additional rigidity to the shackle 10.

As shown in FIG. 1, the upper end of the shackle 10 is pivoted to spring 13 by a bolt 24 passing through openings 23 in arms 22 of the shackle 10 and through a bearing of conventional construction in the free end of the spring 13. The lower end of shackle 10 is pivotally mounted on shackle bracket 11 by a bolt 25 passing through spaced leg portions of the bracket 11 and through the opening in bearing 15 of shackle 10. In this manner, the end of the spring 13 is pivotally supported on the upper end of shackle 10. The other end of spring 13 not shown is similarly mounted by a shackle 10.

In operation, the spring supports the vehicle in the normal manner. Shackle 10 may be manufactured at low cost and has sufficient strength to withstand side sway and side loads incident to movement of the vehicle along the ground.

A modified form of shackle 30 is shown in FIGS. 5 and 6. Shackle 30 comprises a flat central body portion 31 and a lower cylindrical portion 32 bent about a shackle bearing 16 and having its end fastened to the lower end of body portion 31 by a rivet 33. As shown in FIG. 6, the end of cylindrical portion 32 is in the form of a tab 34 and engages the lower part 31a of body 31 which is in a different plane than the upper part 31b thereof. Flanges 32 extend laterally at a right angle from the body portion 31 to form arms 35 having aligned openings 36 therein. As shown in FIG. 6, the upper part 31b of body portion 31 comprises diverging legs 37. The shackle 30 shown in FIGS. 5 and 6 is used to mount the end of the spring in the same manner as the shackle 10 in FIG. 1.

A further modified form of spring shackle 40 is shown in FIGS. 7 and 8. Shackle 40 comprises a central body portion 41, a lower cylindrical portion 42 supporting shackle bearing 15 and a tab 42a extending from and riveted to the central body portion 41 by rivets 43. Spaced flanges 44 extend laterally at a right angle from central portion 41 and form spaced arms 45 at the upper ends thereof having aligned openings 46 therein. The axes of openings 46 are vertically aligned and parallel to the axis of cylindrical portion 42. Shackle 40 is used to suspend the free end of a spring in the same manner as shackle 10 in FIG. 1.

A shackle embodying the invention may be also used for supporting the end of a spring directly from a frame as shown in FIGS. 9–11. Referring to FIG. 9, frame 50 includes a bifurcated bracket 51 thereon on which shackle 50 is pivotally mounted and extends downwardly to support the free end of the spring 13. The shackle shown in FIGS. 9, 10 and 11 includes a central body portion 53 having a cylindrical portion 54 at one end thereof, the free end of which is welded or brazed to the edges of laterally extending flanges 55 as at 56. Flanges 55 include arms 57 at the free ends thereof having aligned openings 58 therein. The plane of body portion 53 is substantially parallel to the plane containing the axes of openings 58 and the axis of cylindrical portion 54.

A shackle bearing 16 is supported by cylindrical portion 54 and a bolt 59 passes through bifurcated shackle bracket 51 and shackle bearing 16 to support the upper end of shackle 50 on frame 52. A bolt 60 passes through openings 58 of the shackle and a corresponding opening in the spring 13 to pivotally support the free end of the spring on the lower end of shackle 50.

Another shackle for supporting the end of a spring directly from a frame is shown in FIGS. 12, 13 and 14. Referring to FIG. 12, frame 60 is provided with a bracket 61 for supporting a bearing 62. A shackle 63 is provided to support the spring and includes a curved central body portion 64 having arms 65 extending laterally at a right angle therefrom and upwardly therefrom. Arms 65 are provided with a lower pair of aligned openings 66 and an upper pair of aligned openings 67. A bolt 68 extends through the upper pair of aligned openings 67 and the bearing 62 in the bracket 61 on the frame 60 to pivotally support a shackle on the frame 60. Another bolt 69 extends through the aligned openings 66 in the lower ends of the arms and a bearing in the spring 13 to pivotally support the end of the spring 13 on the shackle.

In each of the forms of the invention, a shackle is provided with sufficient strength to properly support a spring and particularly to withstand the side pressures incident to movement of the vehicle along the ground. Each shackle may be formed from a single stamping resulting in a shackle that can be manufactured at low cost.

I claim:

1. The combination comprising a vehicle frame member, a leaf spring, a spring shackle made from a single piece of sheet material comprising a substantially flat central body portion having opposed surfaces, an integral cylindrical portion bent from one end of said body portion and having its free end fastened to one surface of said body portion, means extending through said cylindrical portion for pivoting said shackle to one of said frame member and said spring, laterally extending flange portions extending from the sides of said body portion in the direction of said other surface of said body portion and away from said free end of said cylindrical portion, each said flange portion having side edges and being connected to said body portion along one side edge and having the other side edge free, said flange portions having the ends thereof remote from said cylindrical portion extending beyond the other end of said flat central body portion, said remote ends of said flange portions having aligned openings therein the axes of which are parallel to the axis of the cylindrical portion, means extending through said aligned openings for pivoting said shackle to the other of said frame member and said spring.

2. The combination set forth in claim 1 wherein said axis of said cylindrical portion lies within the plane of said central body portion, said axis of the aligned openings being spaced from the plane of said central body portion.

3. The combination set forth in claim 1 wherein the major portion of said body portion lies out of the plane containing the axes of said aligned openings in said flange portions and said cylindrical portion.

4. The combination set forth in claim 1 wherein said flange portions diverge outwardly in a direction axially of said cylindrical portion and away therefrom.

5. The combination set forth in claim 1 wherein said flange portions are curved outwardly from the center of the sides of said body portion toward the ends of said body portion.

6. The combination set forth in claim 1 wherein the part of said body portion which is adjacent said cylindrical portion is substantially flat, the remaining part of said body portion extending outwardly and forming an angle with the plane of the first mentioned part, the sides of said remaining part extending outwardly in a direction axially of said cylindrical portion.

7. The combination set forth in claim 1 wherein the plane containing the axes of said aligned openings and the axis of said cylindrical portion forms an angle with the plane of said central body portion.

8. The combination comprising a vehicle frame member, a leaf spring, a spring shackle made from a single piece of sheet material comprising a substantially flat central body portion having opposed surfaces, said body portion having four corners lying generally within and defining a rectangle, the diagonals of said rectangle lying entirely within said central body portion, an integral cylindrical portion bent from one end of said body portion and having its free end fastened to one surface of said body portion, means extending through said cylindrical portion for pivoting said shackle to one of said frame member and said spring, laterally extending flange portions extending from the sides of said body portion in the direction of said other surface of said body portion and away from said free end of said cylindrical portion, each said flange portion having side edges being connected to said body portion along one side edge and having the other side edge free, said flange portions having the ends thereof remote from said cylindrical portion extending beyond the other end of said flat central body portion, said remote ends of said flange portions having aligned openings therein the axes of which are parallel to the axis of the cylindrical portion, means extending through said aligned openings for pivoting said shackle to the the other of said frame member and said spring.

References Cited in the file of this patent

UNITED STATES PATENTS

| | | |
|---|---|---|
| 1,570,522 | Patterson | Jan. 19, 1926 |
| 1,664,321 | Quist | Mar. 27, 1928 |
| 2,227,306 | Guy | Dec. 31, 1940 |
| 2,245,201 | Kjolseth | June 10, 1941 |

FOREIGN PATENTS

| | | |
|---|---|---|
| 302,038 | Great Britain | Dec. 13, 1928 |
| 886,553 | Germany | Aug. 13, 1953 |